United States Patent
Aboutalib et al.

(10) Patent No.: US 7,627,170 B2
(45) Date of Patent: Dec. 1, 2009

(54) PROCESS FOR THE IDENTIFICATION OF OBJECTS

(75) Inventors: Omar Aboutalib, Diamond Bar, CA (US); Richard R. Ramroth, Long Beach, CA (US); Bea Thai, Huntington Beach, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 620 days.

(21) Appl. No.: 11/247,422

(22) Filed: Oct. 11, 2005

(65) Prior Publication Data

US 2007/0081723 A1    Apr. 12, 2007

(51) Int. Cl.
G06K 9/00    (2006.01)

(52) U.S. Cl. .................. 382/170; 382/173; 382/190; 382/103; 382/154; 250/221; 250/393; 356/601; 356/5.05; 356/611

(58) Field of Classification Search ........... 382/103, 382/154, 172, 173, 199, 170, 217, 218; 250/221, 250/393; 701/223
See application file for complete search history.

(56) References Cited

U.S. PATENT DOCUMENTS

| | | | | |
|---|---|---|---|---|
| 5,162,861 A * | 11/1992 | Tamburino et al. | ......... | 356/5.05 |
| 5,640,468 A * | 6/1997 | Hsu | ............... | 382/190 |
| 5,982,930 A | 11/1999 | Neff et al. | ............... | 382/209 |
| 6,151,424 A * | 11/2000 | Hsu | ............... | 382/294 |
| 6,259,803 B1 * | 7/2001 | Wirtz et al. | ............... | 382/103 |
| 6,404,920 B1 * | 6/2002 | Hsu | ............... | 382/190 |
| 6,449,384 B2 | 9/2002 | Laumeyer et al. | ........... | 382/104 |
| 6,611,344 B1 * | 8/2003 | Chuang et al. | ............... | 356/601 |
| 6,611,622 B1 | 8/2003 | Krumm | ............... | 382/170 |
| 6,720,971 B1 * | 4/2004 | Yamamoto et al. | ........... | 345/581 |
| 6,807,304 B2 | 10/2004 | Loce et al. | ............... | 382/209 |
| 6,829,371 B1 | 12/2004 | Nichani et al. | ............... | 383/103 |
| 7,136,171 B2 * | 11/2006 | Tu et al. | ............... | 356/611 |
| 7,176,440 B2 * | 2/2007 | Cofer et al. | ............... | 250/221 |
| 7,298,866 B2 * | 11/2007 | Lee | ............... | 382/103 |
| 7,359,782 B2 * | 4/2008 | Breed | ............... | 701/45 |
| 7,469,160 B2 * | 12/2008 | Banks et al. | ............... | 600/476 |
| 2002/0001398 A1 | 1/2002 | Shimano et al. | ............... | 382/104 |
| 2002/0044691 A1 | 4/2002 | Matsugu | ............... | 382/218 |
| 2002/0125435 A1 | 9/2002 | Cofer et al. | ............... | 250/341.1 |
| 2002/0181780 A1 * | 12/2002 | Simon et al. | ............... | 382/209 |
| 2004/0080449 A1 * | 4/2004 | Horibe | ............... | 342/70 |

OTHER PUBLICATIONS

Invariant Hough Transformation with matching technique for the recognition of non-analytic objects, IEEE 1993.*
Applicant submitted fax dated Sep. 29, 2009.*

* cited by examiner

*Primary Examiner*—Vikkram Bali
*Assistant Examiner*—Nancy Bitar
(74) *Attorney, Agent, or Firm*—Louis L Dachs (57) ABSTRACT

The invention is a process for identifying an unknown object. In detail, the process includes the steps of: 1) compiling data on selected features on a plurality of segments of a plurality of known objects; 2) illuminating the unknown object with a laser radar system; 3) dividing the unknown object into a plurality segments corresponding to each of the segments of the known objects; 4) sequentially measuring selected features of each of the plurality of segments of the unknown object; and 5) comparing the sequentially measuring selected features of each of the plurality of segments of the unknown object to the selected features on the plurality of segments of the plurality of known objects.

6 Claims, 12 Drawing Sheets

FIG. 1

- PAIR OF POINTS, P & Q
- SURFACE PATCHES AROUND P & Q
- OUTWARD NORMALS, $\hat{n}_p$ & $\hat{n}_q$
- VECTOR FROM Q TO P (P-Q)
- $\hat{n}_p + \hat{n}_q$
- $\hat{n}_p \times \hat{n}_q$

INVARIANTS

- DISTANCE BETWEEN P AND Q
- ANGLE BETWEEN NORMALS, $\hat{n}_p$ & $\hat{n}_q$
- (P-Q) NORMALIZED ALONG $\hat{n}_p + \hat{n}_q$
- (P-Q) NORMALIZED ALONG $\hat{n}_p \times \hat{n}_q$

PIXEL PAIR INVARIANTS

EXPANDED TARG

| | | BRDM | | BTR-60 | | BTR-70 | | BTR-80 | | M1 | |
|---|---|---|---|---|---|---|---|---|---|---|---|
| BRDM TRUCK | c | 1.000 | 0.000 | 0.000 | 0.000 | 0.000 | 0.000 | 0.000 | 0.000 | 0.000 | 0.000 |
| | w | 0.000 | 1.000 | 0.000 | 0.000 | 0.000 | 0.000 | 0.000 | 0.000 | 0.000 | 0.000 |
| BTR-60 TRUCK | c | 0.000 | 0.989 | 0.000 | 0.000 | 0.000 | 0.000 | 0.000 | 0.000 | 0.000 | 0.000 |
| | w | 0.000 | 0.000 | 0.000 | 1.000 | 0.000 | 0.000 | 0.000 | 0.000 | 0.000 | 0.000 |
| BTR-70 TRUCK | c | 0.000 | 0.000 | 0.000 | 0.000 | 0.856 | 0.000 | 0.000 | 0.122 | 0.000 | 0.000 |
| | w | 0.000 | 0.000 | 0.000 | 0.000 | 0.000 | 0.867 | 0.000 | 0.000 | 0.000 | 0.000 |
| BTR-80 TRUCK | c | 0.000 | 0.000 | 0.000 | 0.000 | 0.022 | 0.000 | 0.956 | 0.000 | 0.000 | 0.000 |
| | w | 0.000 | 0.000 | 0.000 | 0.000 | 0.000 | 0.056 | 0.000 | 0.933 | 0.000 | 0.000 |
| M1A1 ? | c | 0.000 | 0.000 | 0.000 | 0.000 | 0.000 | 0.000 | 0.000 | 0.000 | 1.000 | 0.000 |
| | w | 0.000 | 0.000 | 0.000 | 0.000 | 0.000 | 0.000 | 0.000 | 0.000 | 0.000 | 0.000 |
| M60A3 ? | c | 0.000 | 0.000 | 0.000 | 0.000 | 0.000 | 0.000 | 0.000 | 0.000 | 0.000 | 0.000 |
| | w | 0.000 | | | | | | | | | |

82A, 82B (0.122, 0.133 circled)

FIG. 9B

ET SET WITH CONFUSERS

| A1 | M60A3 | SA-13 | SA-6 | SA |
|---|---|---|---|---|
| 0.000 0.000 | 0.000 0.000 | 0.000 0.000 | 0.000 0.000 | 0.000 0.000 |
| 0.000 0.000 | 0.000 0.000 | 0.000 0.000 | 0.000 0.000 | 0.000 0.000 |
| 0.000 0.000 | 0.000 0.000 | 0.011 0.000 | 0.000 0.000 | 0.000 0.000 |
| 0.000 0.000 | 0.000 0.000 | (0.011) 0.000 | 0.000 0.000 | (0.011) 0.000 |
| 0.000 0.000 | 0.000 0.000 | 0.000 0.022 | 0.000 0.000 | 0.000 0.000 |
| 0.000 0.000 | 0.000 0.000 | 0.011 0.000 | 0.000 0.000 | 0.000 0.000 |
| 0.000 0.000 | 0.000 0.000 | 0.000 0.000 | 0.000 0.000 | 0.000 0.000 |
| 0.000 1.000 | 0.000 1.000 | 0.000 0.989 | 0.000 0.000 | 0.000 0.000 |

| -9 | SCUD | | T-62 | | T-72 | |
|---|---|---|---|---|---|---|
| 0.000 | 0.000 | 0.000 | 0.000 | 0.000 | 0.000 | 0.000 |
| 0.000 | 0.000 | 0.000 | 0.000 | 0.000 | 0.000 | 0.000 |
| 0.000 | 0.000 | 0.000 | 0.000 | 0.000 | 0.000 | 0.000 |
| 0.000 | 0.000 | 0.000 | 0.000 | 0.000 | 0.000 | 0.000 |
| 0.000 | 0.000 | 0.000 | 0.000 | 0.000 | 0.000 | 0.000 |
| 0.000 | 0.000 | 0.000 | 0.000 | 0.000 | 0.000 | 0.000 |
| 0.000 | 0.000 | 0.000 | 0.000 | 0.000 | 0.000 | 0.000 |
| 0.000 | 0.000 | 0.000 | 0.000 | 0.000 | 0.000 | 0.000 |
| 0.000 | 0.000 | 0.000 | 0.000 | 0.000 | 0.000 | 0.000 |
| 0.000 | 0.000 | 0.000 | 0.000 | 0.000 | 0.000 | 0.000 |

FIG. 9D

| | | | | | | | | | | | |
|---|---|---|---|---|---|---|---|---|---|---|---|
| SA-13 LAUNCHER | C | 0.000 | 0.000 | 0.000 | 0.000 | 0.000 | 0.000 | 0.000 | 0.000 | 0.000 | 0.000 |
| | W | 0.000 | 0.000 | 0.000 | 0.000 | 0.000 | 0.000 | 0.000 | 0.000 | 0.000 | 0.000 |
| SA-6 LAUNCHER | C | N/A | N/A | N/A | N/A | N/A | N/A | N/A | N/A | N/A | N/A |
| | W | N/A | N/A | N/A | N/A | N/A | N/A | N/A | N/A | N/A | N/A |
| SA-9 LAUNCHER | C | 0.000 | 0.000 | 0.000 | 0.000 | 0.000 | 0.000 | 0.000 | 0.000 | 0.000 | 0.000 |
| | W | 0.000 | 0.000 | 0.000 | 0.000 | 0.000 | 0.000 | 0.000 | 0.000 | 0.000 | 0.000 |
| SCUD/TEL LAUNCHER | C | 0.000 | 0.000 | 0.000 | 0.000 | 0.000 | 0.000 | 0.000 | 0.000 | 0.000 | 0.000 |
| | W | 0.000 | 0.000 | 0.000 | 0.000 | 0.000 | 0.000 | 0.000 | 0.000 | 0.000 | 0.000 |
| T-62 TANK | C | 0.000 | 0.000 | 0.000 | 0.000 | 0.000 | 0.000 | 0.000 | 0.000 | 0.000 | 0.000 |
| | W | 0.000 | 0.000 | 0.000 | 0.000 | 0.000 | 0.000 | 0.000 | 0.000 | 0.000 | 0.000 |
| T-72 TANK | C | 0.000 | 0.000 | 0.000 | 0.000 | 0.000 | 0.000 | 0.000 | 0.000 | 0.000 | 0.000 |
| | W | 0.000 | 0.000 | 0.000 | 0.000 | 0.000 | 0.000 | 0.000 | 0.000 | 0.000 | 0.000 |

C = CHASSIS
W = WEAPON SYSTEM/ANTENNA

| 0.000 | 0.000 | 0.000 | N/A | N/A | 0.000 | 0.000 | 0.000 | 0.000 | 0.000 | 0.033 | 0.000 | 0.000 |
|---|---|---|---|---|---|---|---|---|---|---|---|---|
| 0.000 | 0.000 | 0.000 | N/A | N/A | 0.000 | 0.000 | 0.000 | 0.000 | 0.000 | 0.000 | 1.000 | 0.000 |
| 0.000 | 0.000 | 0.000 | N/A | N/A | 0.000 | 0.000 | 0.000 | 0.000 | 0.000 | 0.967 | 0.000 | 0.000 |
| 0.000 | 0.000 | 0.000 | N/A | N/A | 0.000 | 0.000 | 0.000 | 0.000 | 1.000 | 0.000 | 0.000 | 0.000 |
| 0.000 | 0.000 | 0.000 | N/A | N/A | 0.000 | 0.000 | 0.000 | 1.000 | 0.000 | 0.000 | 0.000 | 0.000 |
| 0.000 | 0.000 | 0.000 | N/A | N/A | 0.000 | 0.000 | 1.000 | 0.000 | 0.000 | 0.000 | 0.000 | 0.000 |
| 0.000 | 0.000 | 0.000 | N/A | N/A | 0.000 | 1.000 | 0.000 | 0.000 | 0.000 | 0.000 | 0.000 | 0.000 |
| 0.000 | 0.000 | 0.000 | N/A | N/A | 1.000 | 0.000 | 0.000 | 0.000 | 0.000 | 0.000 | 0.000 | 0.000 |

PROCESS FOR THE IDENTIFICATION OF OBJECTS

GOVERNMENT INTEREST

This invention was made under US Government Contract No.: FZ6830-01-D-002 issued by the US Air Force dated March 2004. Therefore, the US Government has the rights to the invention granted thereunder.

BACKGROUND OF THE INVENTION

1. Field of the Invention

The invention relates to the field of identification of objects such as structures and vehicles and, in particular, to a process for the identification of structures and vehicles using laser radars.

2. Description of Related Art

The identification of targets under battlefield conditions is a major problem. Of course, direct visual contact by trained personnel is the most accurate, but this exposes them to possible attack and significantly increases personnel workload. Thus in recent years, the use of unmanned surveillance vehicles, particularly unmanned aircraft, have been used for battlefield surveillance. However, to avoid constant monitoring of the unmanned vehicle; they are being equipped with autonomous systems that identify and classify potential targets and only inform the remotely located operator when such a target is identified.

Traditional Laser radar identification techniques have limitations in identification of articulated targets because of the large number of potential target states due to the large number of potential target articulation, variations, and pose. The utility of invariant features for the model-based matching of the entire target will reduce the search space but will not yield reliable estimates of target identification and pose. One approach is use a laser radar system to map the vehicle and record invariant parameters. These observed parameters are compared to those stored in a data base to find a match. However, this method has proved to be cumbersome to implement; because the whole structure, typically vehicles such as tanks or missile launchers, had to be compared to every other structure in the data base.

Thus, it is a primary object of the invention to provide a process for the identification of objects without human intervention.

It is another primary object of the invention to provide a process for the identification of unknown objects without human intervention that uses a laser radar for illumination.

It is a further object of the invention to provide a process for the identification of objects without human intervention that uses a laser radar for illumination and which provides optimum identification with minimum computing time.

SUMMARY OF THE INVENTION

The invention is a process for identifying an unknown object. In detail, the process includes the steps of:

1. Compiling data on selected features on a plurality of segments of a plurality of known structures. Preferably, the plurality of segments includes the top and bottom or the top, middle and bottom of the object. This also includes the step of making piecewise pixel-pair invariant measurements of each of the plurality of segments of the known structures.
2. Illuminating the unknown structure with a laser radar system;
3. Dividing the unknown structure into a plurality segments corresponding to each of the segments of the known structures;
4. Sequentially measuring selected features of each of the plurality of segments of the unknown structure. This includes the steps of making piecewise pixel-pair invariant measurements of each of the plurality of segments of the unknown structure; and comparing the piecewise pixel-pair invariant measurements of each of the plurality of segments of the unknown structure until a match is found. This includes the distance between first and second pixels of the pixel-pairs, the angle between the normals to the surface area about the first and second pixels, the normalized distance between the first and second pairs projected along the vector that is the sum of the two normals, and the normalized distance between the first and second pixels along the vector that is the cross product of the two normals.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

The invention is a process for identifying potential targets by means of a laser radar system that does not require human involvement. It is designed for use on an unmanned surveillance vehicle. This process is used after the vehicle has determined that a potential target exists.

In surveillance mission, the unmanned vehicle is sent to a target area based on cues from intelligence gathered or cues from other long-range surveillance platforms. Due to target location error and potential target movements, the unmanned vehicle needs perform its own search upon arrival to the target area using wide footprint sensors such as Synthetic Aperture Radar (SAR) or wide field of view Infrared Sensor. Upon detection of potential regions of interest (ROIs), the Laser Radar sensor is then cued to these ROIs to re-acquire and identify the target and select the appropriate aim point to enhance weapon effectiveness, and reduce fratricide due to enemy fire.

Figure 1:
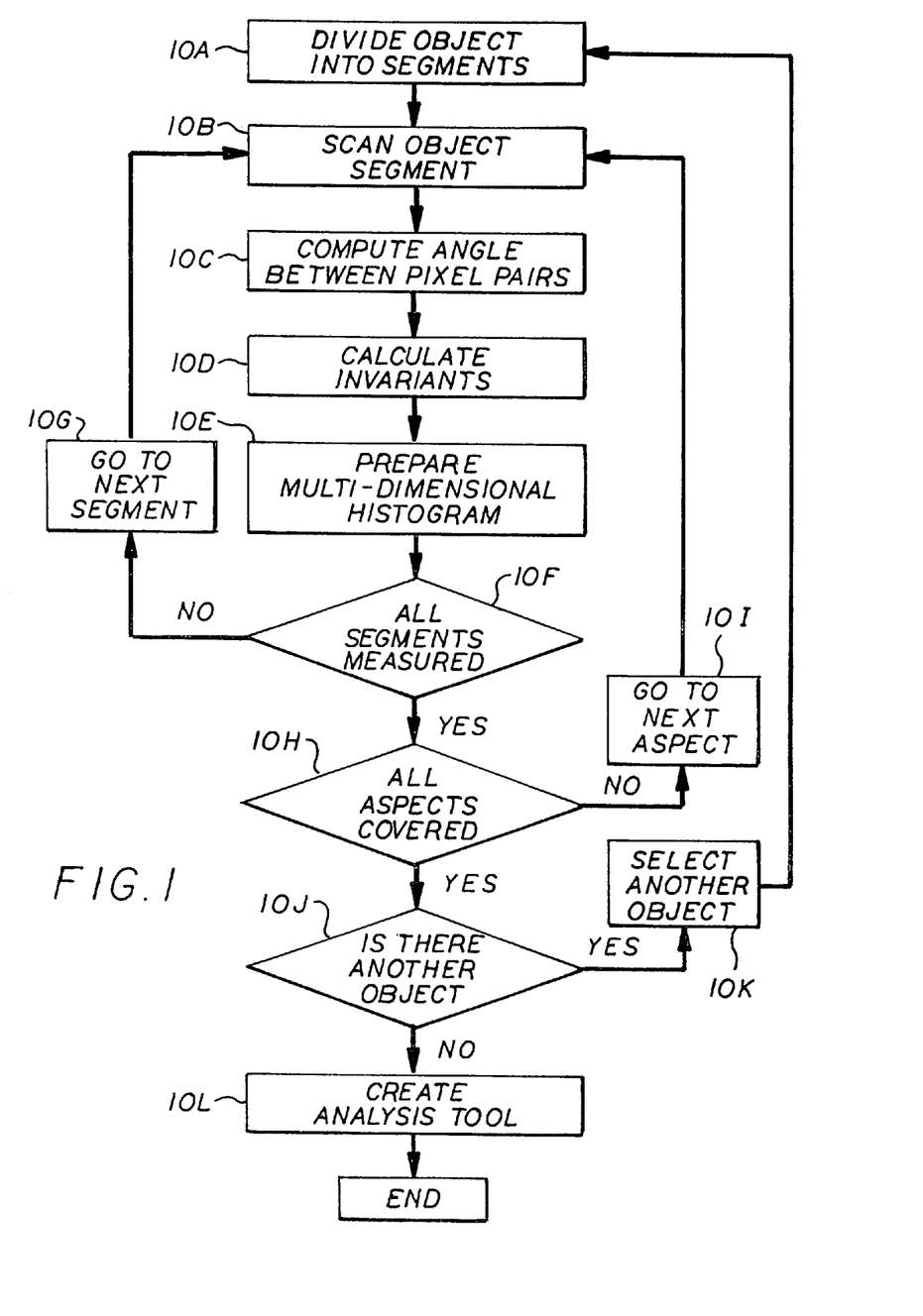
FIG. 1 is a flow chart of the process to establish a reference library.

Referring to FIG. 1, in detail the invention involves the following steps:

Step 10—Set Up A library Of Target Descriptions

Step 10A—Divide Objects in Segments that can be articulated. All structures that are of interest are first scanned by a laser radar system using simulation or actual data collection. The object is divided into sections. For example, referring to FIGS. 2 and 3, a tank 12 would be divided into a hull 12A, turret 12B and gun 12C, a SA-6 missile launching vehicle 14 would be divided into a hull 14A, missile carriage 14B and missiles 14C.

Figure 4:
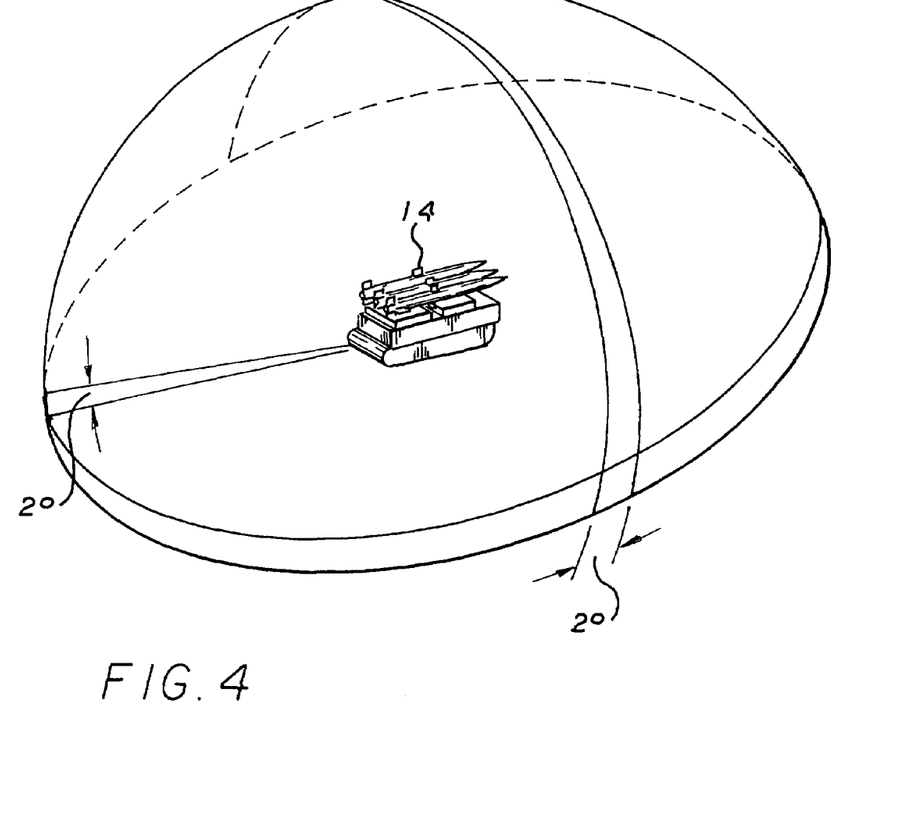
FIG. 4 is a perspective view of a missile launcher illustrating the position of a laser radar during the scanning of the launcher.

Step 10B—Scan Object Segment. Thereafter each section is scanned by the laser radar system at various positions in a spherical pattern at approximately two degree steps are made as illustrated in FIG. 4. This can be accomplished using high fidelity physics-based modeling tools to generate target signature using laser radar in simulation or using actual sensor in a field data collection.

Step 10C—Compute Angle Between Pixel Pairs: The angle between every two pairs of normals is computed using the dot product of the two normals $$\cos\theta = \frac{n_I * n_J}{|n_I| * |n_J|}$$

Where:
$n_I$=the unit vector representing the surface normal at one pixel
$n_J$=the unit vector representing the surface normal at one pixel
.=refers to the dot product between two vectors Only those pixel pairs having angles between 80 and 100 degrees are saved.

Figure 2:
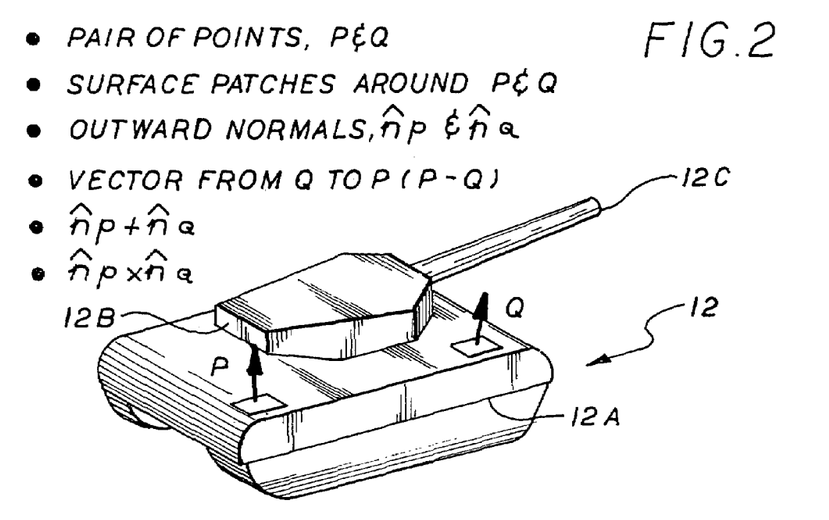
FIG. 2 is a perspective view of a tank
Figure 3:
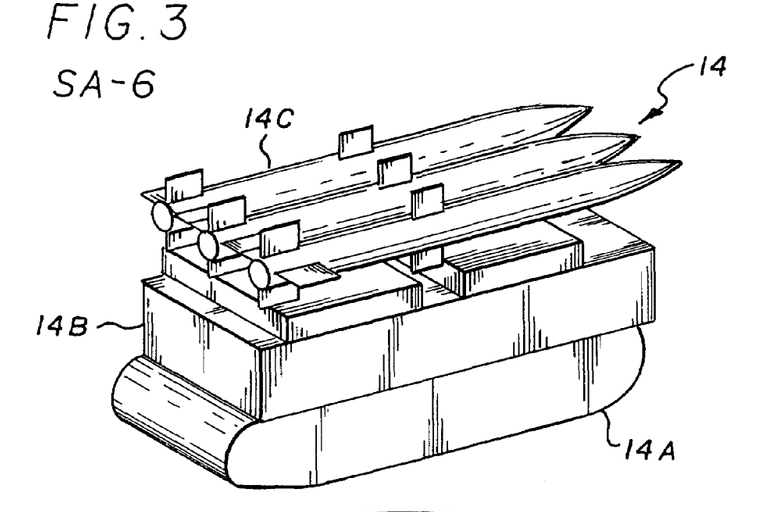
FIG. 3 is a perspective view of a missile launcher vehicle
Figure 5:
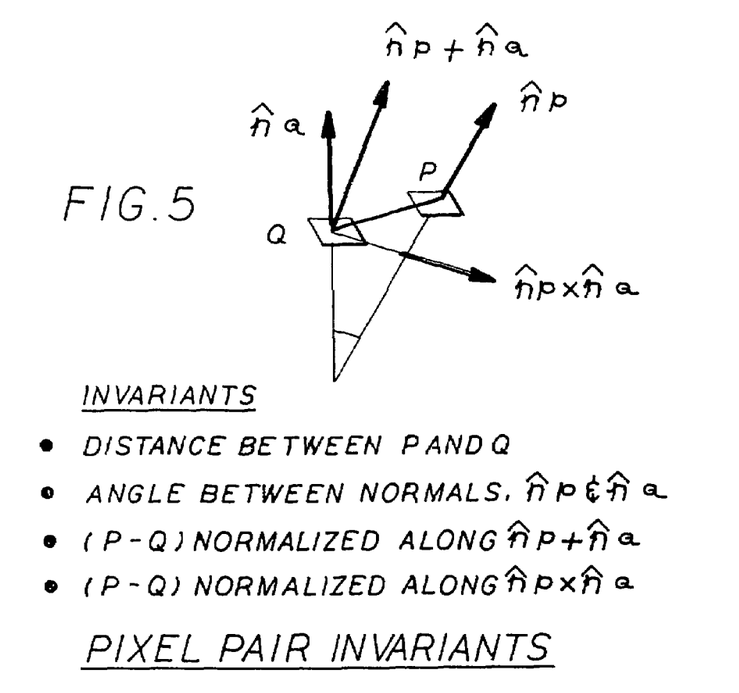
FIG. 5 is representation of a patch around a pixel; of a pixel pair illustrating the calculation of the normal vector.

The process continues with the following steps:

Step 10D-Calculate Invariants: After each measurement four invariant features are recorded for each pixel pair. Referring to FIGS. 2 and 5 these includes:

1. The distance between the first (P) and second (Q) pixels of the pixel-pairs, $$A_{INV}=\|P-Q\| \quad (1)$$

Where: $A_{inv}$=Distance between pixel points

2. The angle between the normals, $\hat{N}_P$ and $\hat{N}_Q$, to the to the surface area about the first and second pixels, $$B_{INV}=\cos^{-1}(\hat{N}_P * \hat{N}_Q) \quad (2)$$

Where:
$\hat{N}_P$=the normalized normal vector to the surface at pixel p computed using neighboring pixels
$\hat{N}_Q$=the normalized normal vector to the surface at pixel Q computed using neighboring pixels
$B_{INV}$=Angle between $\hat{N}_P$ and $\hat{N}_Q$ 3. The normalized distance between the first and second pairs along $\hat{N}_P+\hat{N}_Q$, $$C_{INV} = \left| (P-Q)_N * \frac{(P-Q)}{(\hat{N}_P + \hat{N}_Q)/2} \right|$$

Where:
$C_{inv}$=normalized distance $\hat{N}_P+\hat{N}_Q$,

4. The normalized distance between the first and second pairs along $\hat{N}_P * \hat{N}_Q$.

$$D_{inv}=(P-Q)_N *(N_P * N_Q)$$

Where:
$D_{INV}$=normalized distance between along the cross product of the two normals $\hat{N}_P \times \hat{N}_Q$ The normal $\hat{N}_P$ is determined by the use of the leased squared error method as illustrated in FIG. 5.

$$B(i, j) = \sum_{K=1}^{9} Pixel_K - \text{Target\_Center} \quad (1)$$

$$A(i, j) = \sum_{K=1}^{9} \begin{vmatrix} X_K \\ Y_K \\ Z_K \end{vmatrix} * (X_K Y_K Z_K) \quad (2)$$

$$X(i, j) = A(i, j)^{-1} * B(i, j) \quad (3)$$

$$n'_P(i, j) = \text{Patch } normal(i, j) = \frac{X(i, j)}{\|X(i, j)\|} \quad (4)$$

$$\text{Patch Centroid}(i, j) = \frac{B(i, j)}{9} \quad (5)$$

Patch Offset(I,j)=Patch Normal(I,j)*Patch Centroid(I, j) (6)

$n_P(i,j)$=one of the predefined normals closest to $Nn'_P$ (7)

Where $X_K Y_K Z_K$ are the Cartesian coordinates of pixel (I,j)

Thus once the normal vectors for the two points (P, Q) are determined, the other invariant features are determined. Only those invariants that have normal vectors between two points between 80 and 100 degrees are used. This will significantly reduce computational complexity and reduce the classification ambiguities due to excessive data.

The process continues with the following steps:

Step 10E—Prepare Multi-Dimensional Histograms. The four invariants measured are first normalized by dividing the largest value for that invariant into all the other values thereof creating numbers varying from zero to one. There a four dimensional array of 81 bins (3×3×3×3=81) is constructed. That is three bins for each variant:

Bin Size $A_{INV}$=(max($A_{INV}$)−min($A_{INV}$))/3

Bin Size $B_{INV}$=(max($B_{INV}$)−min($B_{INV}$))/3

Bin Size $C_{INV}$=(max($C_{INV}$)−min($C_{INV}$))/3

Bin Size $D_{INV}$=(max($D_{INV}$)−min($D_{INV}$))/3

A bin is determined for each pair of pixels:

Index $A_{INV}$=(INT)(($A_{INV}$)−min($A_{INV}$))/BinSize$A_{INV}$

Index $B_{INV}$=(INT)(($B_{INV}$)−min($B_{INV}$))/BinSize$B_{INV}$

Index $C_{INV}$=(INT)(($C_{INV}$)−min($C_{INV}$))/BinSize$C_{INV}$

Index $D_{INV}$=(INT)(($D_{INV}$)−min($D_{INV}$))/BinSize$D_{INV}$

The number of bins is somewhat arbitrary, but testing has shown that excellent results are obtained using only 3 bins.

Step 10F—Determine If All Segments Measured. If yes to Step 10G, if no to Step 10H Step 10G—Go to Next Segment—The program returns to Step 10B Step 10H—Determine if All Aspects Covered. In this step, a determination is made as to whether all aspects have been covered by taking readings at two degree increments around and over the object as illustrated in FIG. 4. If all aspects have not been covered then go to Step 10I; if yes, then go to step 10J Step 10I—Go to next aspect—The laser radar is repositioned and the program returns to Step 10B Step 10J—Determine If There Is Another object. A determination as to whether another object is to be added to program, if yes to Step 10K, if no to step 10L.

Figure 6:
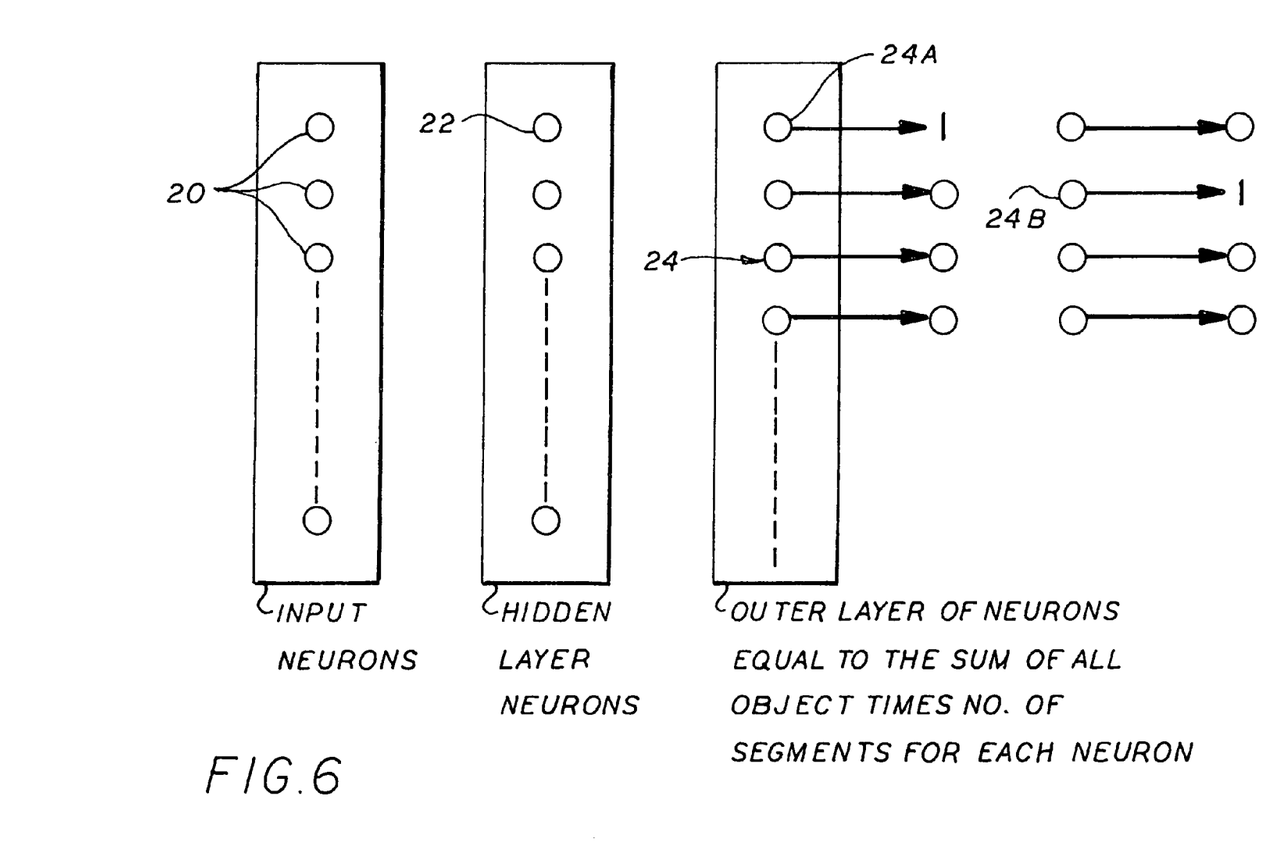
FIG. 6 is representation of the neural used to process the pixel pair invariants.

Step 10K, a new object is selected and the program returns to Step 10A;

The process continues with the following steps:

Step 10L—Create Analysis Tool. The data created during Step 10E is fed to the neural net shown in FIG. 6. The net includes 81 input neurons. It has input layer, a hidden layer, and an output layer. The output layer has a number of nerons equal to the total number of sections of all targets that the neural network is trained on. The neural net is trained to provide a value of one for a single output neuron with all the others equal to zero. Thus for the tank hull 12A shown in FIG. 1 the output neuron 24A would have a value of 1 and all the remaining neurons would be equal to zero. Thereafter the data from the histogram would be fed into the neural net to train it. For example, for the turret 12B, the value of the second output neuron 24B would be set to 1 and all others set at zero and so. This would be repeated for every segment of every object to be placed in the library. A decision tree or a Hash table could be substituted for the neural net analysis tool.

Figure 7:
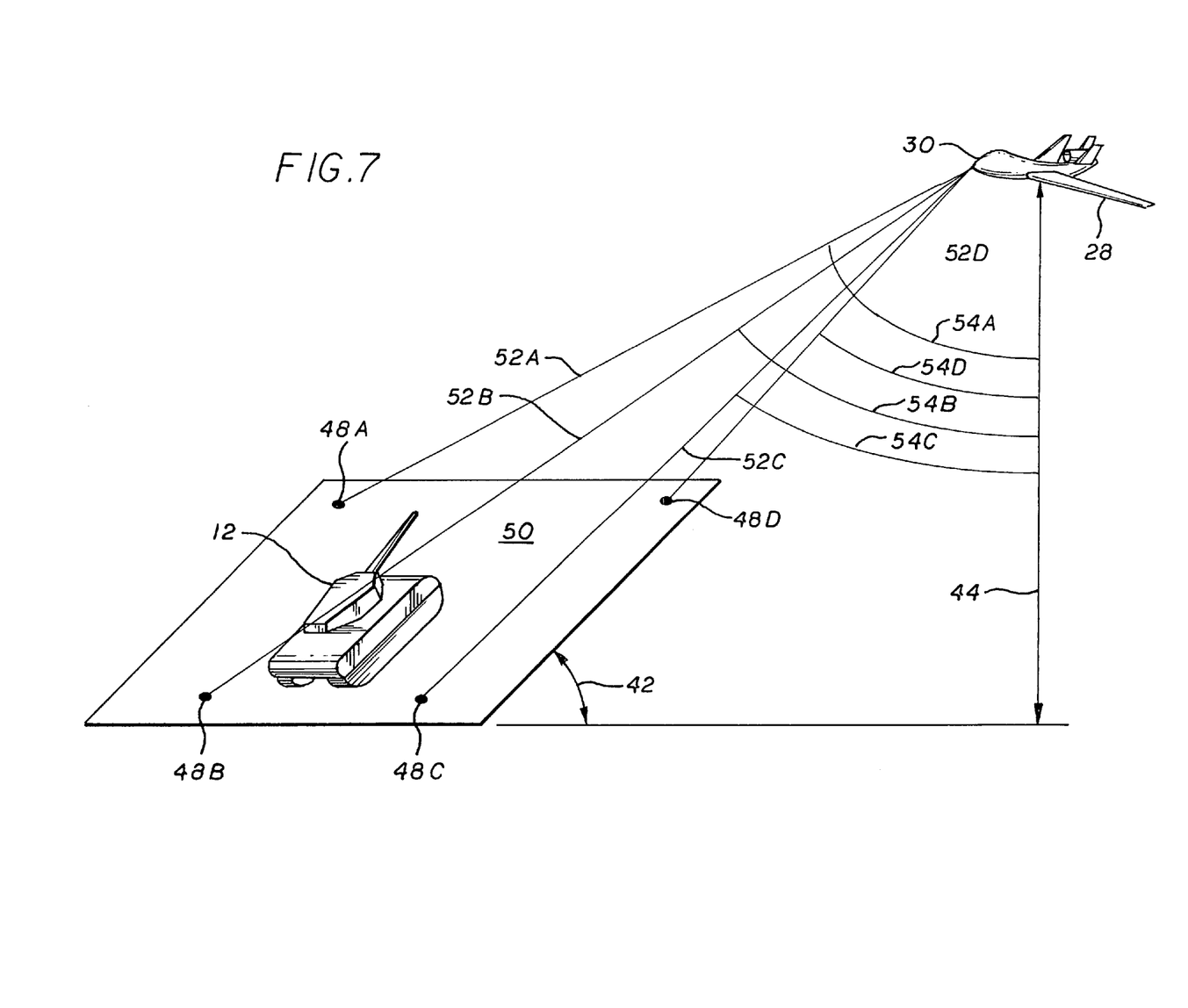
FIG. 7 is perspective view of a missile launcher and an aircraft illustrating the determination of the normal to the surface upon which the launcher rests.
Figure 8:
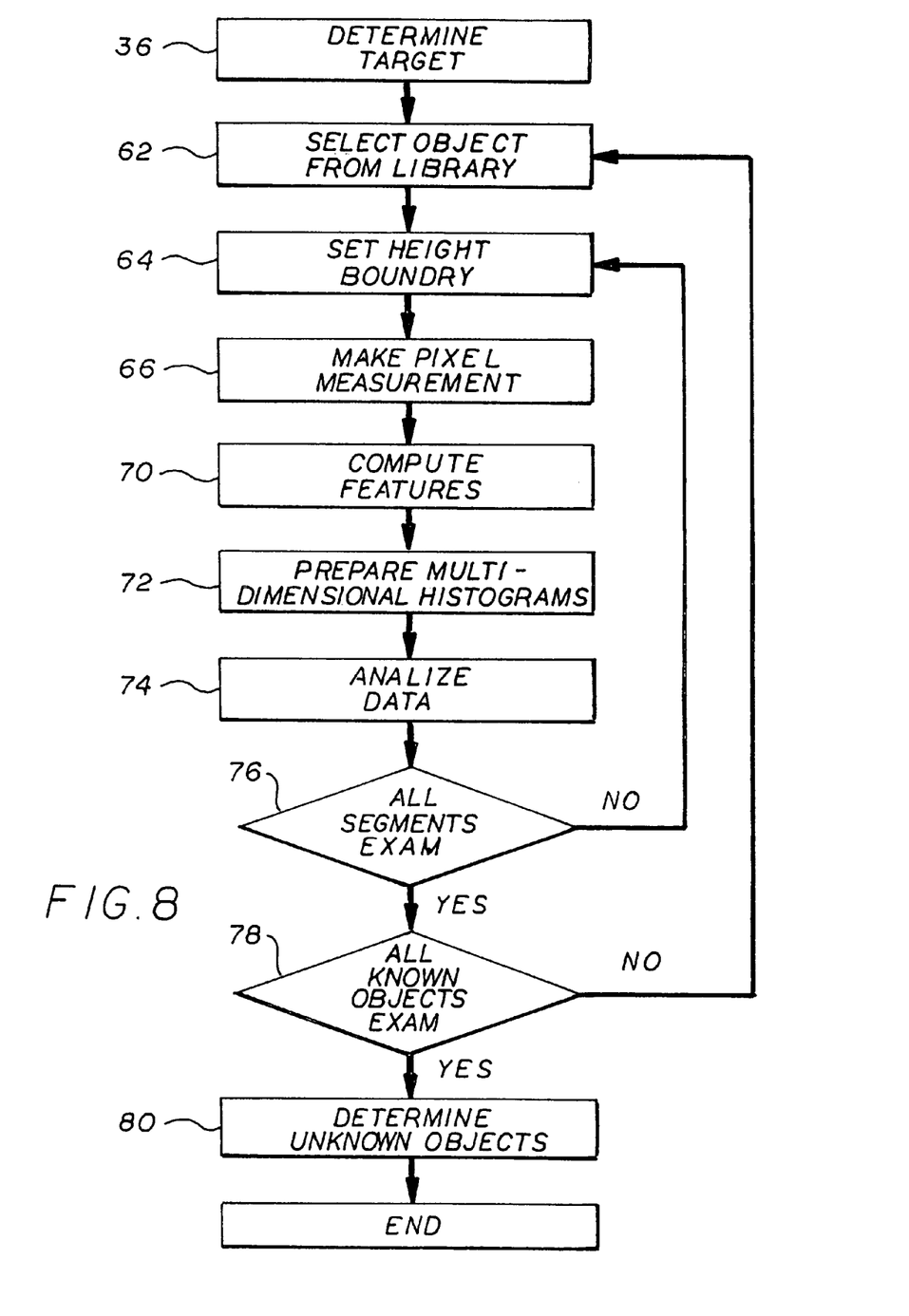
FIG. 8 is a flow chart of the process to identify an unknown object

Referring to FIG. 7, the library is loaded into a computer on an aircraft 28 having a laser radar 30. When an object of interest, for example the tank 12 shown in FIG. 2 (but unknown to the computer on broad the aircraft 28), the computer will analyze the object in the following manner. Preferably, the aircraft 28 should be at a 30 to 60 degree depression angle to the unknown object.

Step 34—Determine Normal To Ground Patch Around Vehicle—Still referring to FIG. 7, the ground segment 40 around the tank is at an angle indicated by numeral 42, is input to the program. Note that the aircraft 28 is located at an altitude indicated by numeral 44 and having a GPS system knows its position above the ground 46. An arbitrary set of four points 48A, 48B, 48C and 48D about the tank 12 are used to define a surface patch 50. The position of the four points 48A-48D can be computed based upon the four laser beams 52A, 52B, 52C and 52D travel time to the points and return and at the angles 54A, 54B, 54C and 54D can be used to computer their distance from the aircraft 28. The ground segment is used to compute the normal vector to the ground plane as given by the following equations for which the normal 28 of the ground segment 11A can be computed.

Step 58—Rotate Object. The tank is mathematically rotated by use of the following equation:

$$x' = x* \cos(\beta) + y*\sin(\alpha)*\sin(\beta) + z*\cos(\beta)*\sin(\beta)$$

$$y' = y*\cos(\alpha) - z*\sin(\alpha)$$

$$z' = y*\sin(\alpha)* \cos(\beta) + z*\cos(\alpha)*\cos(\beta) - x*\sin(\beta)$$

where x, y, z represent the original x, y, z coordinates and x', y', z' represent the newly rotated coordinates $\alpha$ = the rotation angle about the x axis, $\beta$ = the rotation angle about the y axis.

Step 62—Select an object from the library, for example, the tank 12 (FIG. 2) which is divided into three segments.

Step 64—Set Height Boundary. The height of the target segment is set along the normal. The bottom segment is first selected. Step 66—Make pixel Measurements. Using the laser radar pixel measurements are made during the laser radar scanning of the object, only one snap shot is required.

Step 68—Compare angles between Normals—The normal to the surfaces around every detected pixel is estimated using the procedure previously discussed in setting up the library. Only pixel pairs whose angle between the normals have values within 80 and 100 degrees are considered for the classification process.

The process continues with the following steps:

Step 70—Computer Invariant Features.

Step 72—Prepare Multi-Dimensional Histograms.

Step 74—Analize Data. Using the trained neural net shown in FIG. 6.

Step 76—All Segments Examined?. If all segments examined go to Step 80, if not return to Step 64 and repeat process for next segment until all segments of the object has been analyzed.

Step78—All Known Objects Examined?. If no return to Step 62 and repeat process for next stored object data in reference library. If yes to Step 80.

Step 80—Determine Unknown Object. The Score from the neural net can vary from 0 to 1; however, a score above 0.90, with all other scores below 0.20 can be considered a positive identification. Several Events can occur.

1. The object is identified
2. No identification is made
3. A multi-number of possible identities are produced.

In the first case, no further processing is required. In the second and third case, the process can be terminated with a conclusion of "no identification possible." Some targets are very similar (such BTR-60, BTR70, and BTR-80 trucks). The classifier based on the laser radar resolution may not be capable to detect adequate details to discriminate among these target types. Therefore if the classification belongs to an ambiguous class, then there will be a request for refined sensor resolution. A sensor modality change is requested to change resolution and re-image and re-segment the target area again. The segmented target is then fed to the software to resolve ambiguity among the similar targets. The corresponding model of the target with the computed articulation state is used to render the model using the sensor parameter file and Irma system (Government multi-sensor simulation that is used to simulate target signatures from target models and sensor parameters). The simulated target signature is compared with the sensed target for final validation.

Additionally, the process starting at Step 64 can be repeated starting with the top segment and working downward to achieve a higher confidence level. It may also establish the identification of a target object when the process measures from the top down. This is because the bottom segment may be obscured by mud or foliage.

The process can also be used to assess battle damage or variation to a given target segment by computing a transformation, which consists of rotation and translation to compare the target piece to the model piece. The transformation equation is $$Y = AX + b \tag{9}$$

Where:
A=rotation matrix
b=translation vector
X and Y=are pixels on the target piece and the model piece.

The above transformation is applied to the target piece to line up with the corresponding model piece. The target piece is then subtracted from the model piece and the residual represents variation or battle damage. The residual can be used to infer the size of variation or the battle damage. All the classification hypotheses corresponding to the various segments as the target sliced up (or down) are combined using Bayesian or Dempster Shafer evidence theory.

Figure 9A:
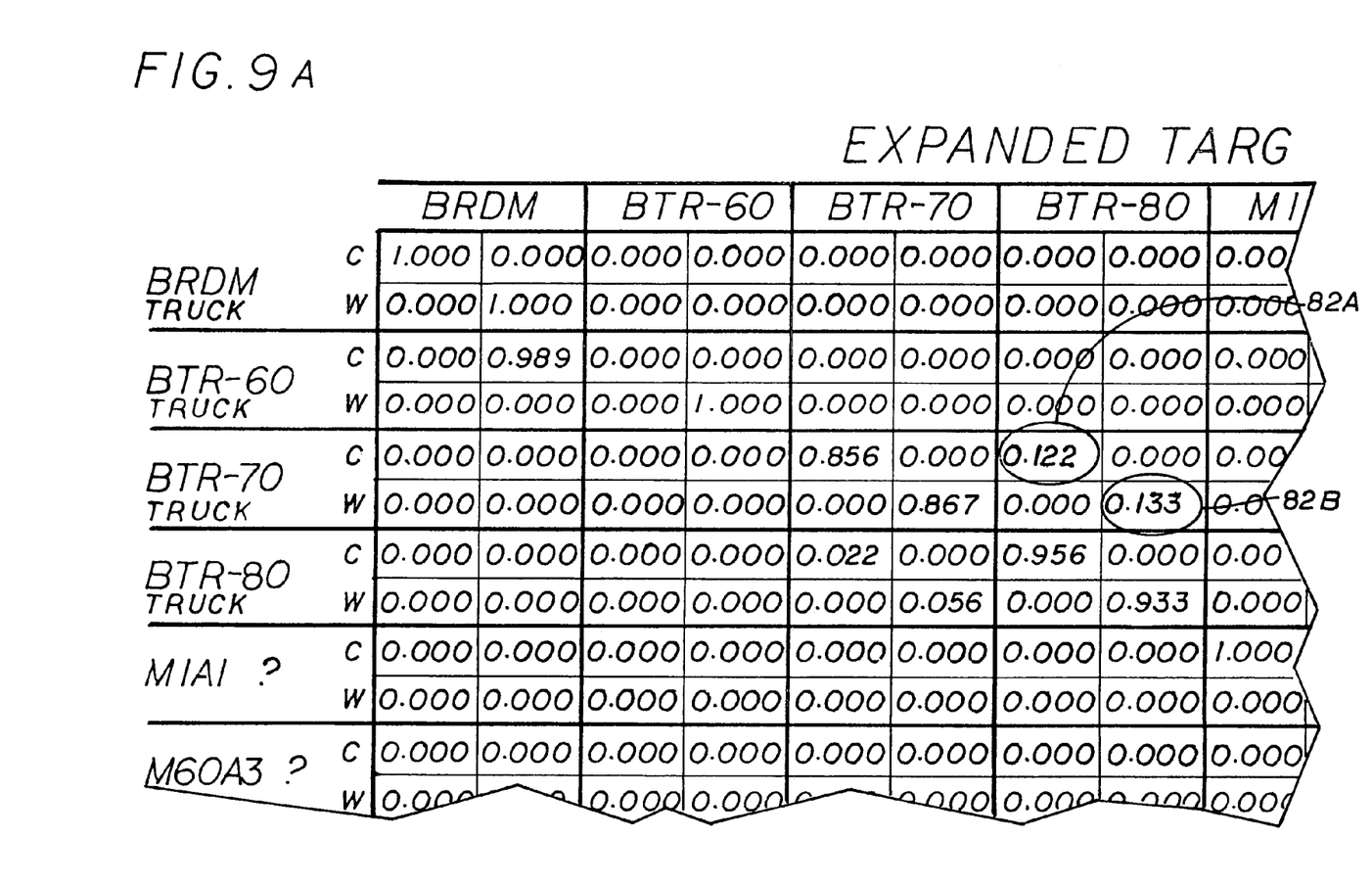
FIG. 9A, 9B, 9C, 9D, 9E, and 9F are six parts to a test results summary.
Figure 9B:
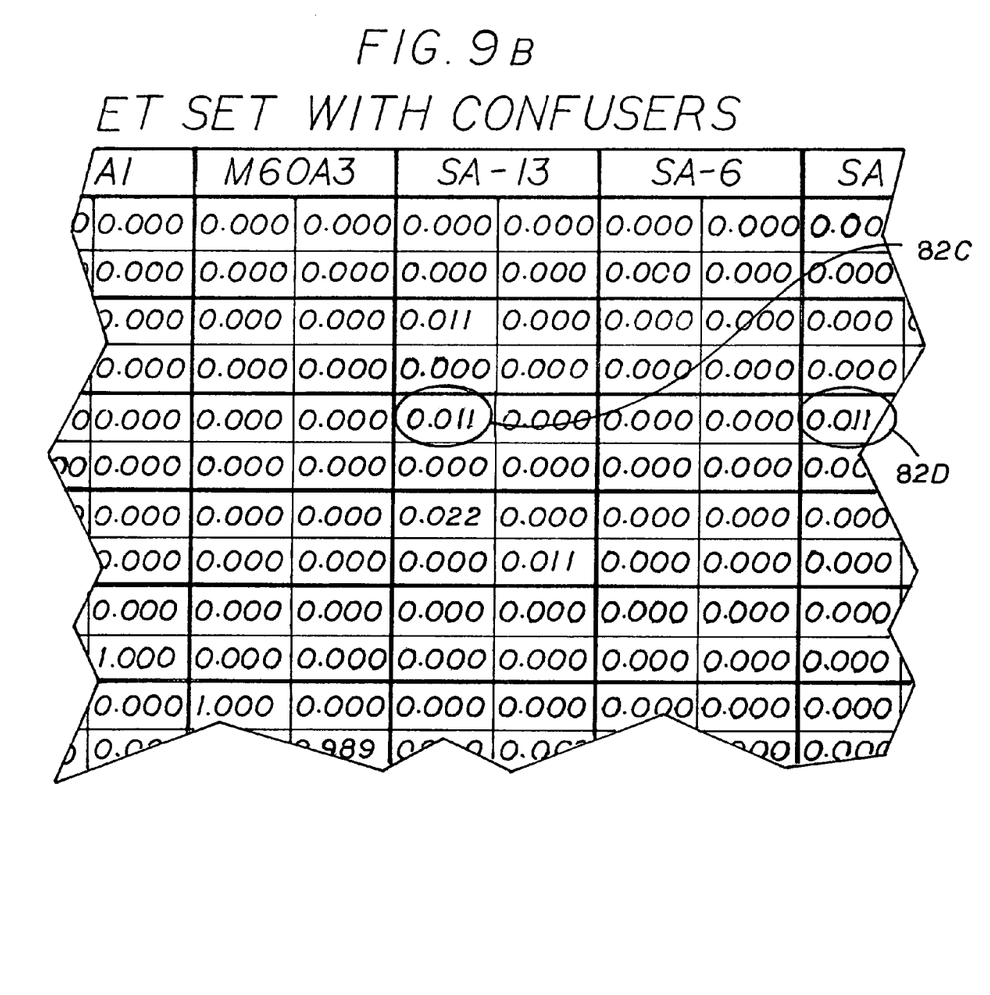
Figure 9C:
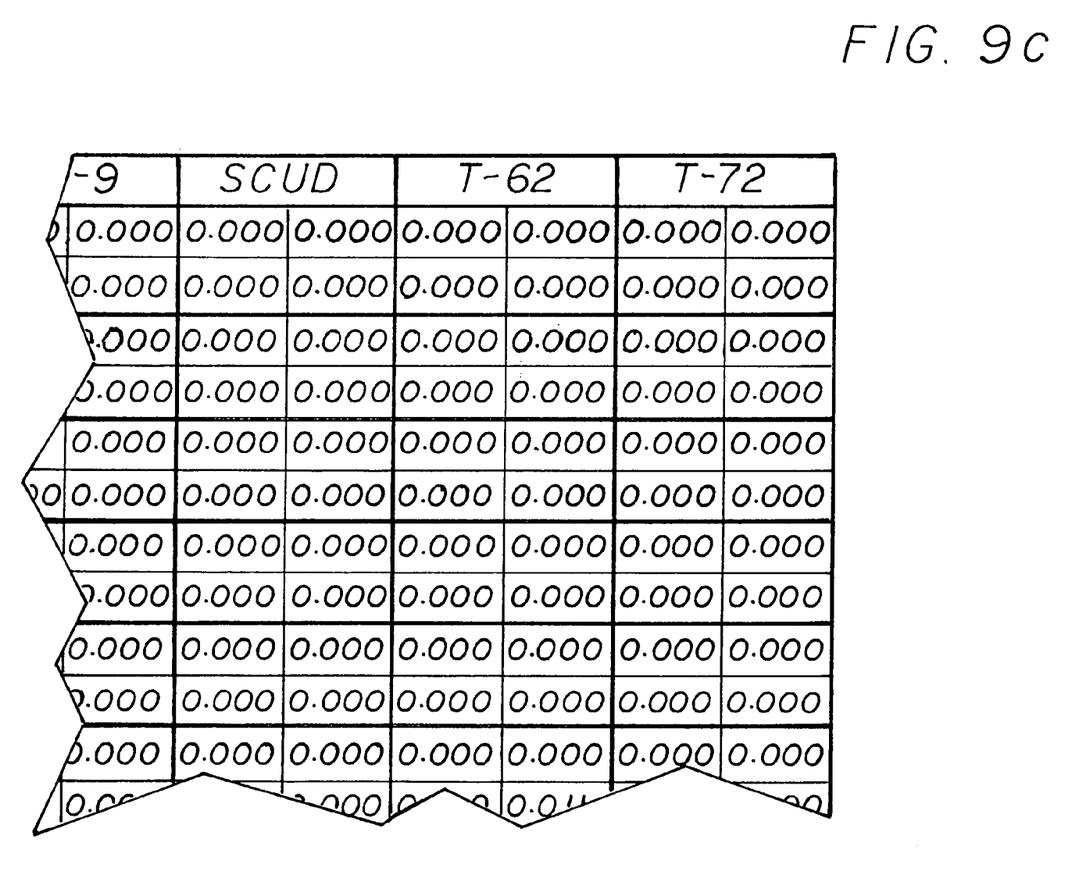
Figure 9D:
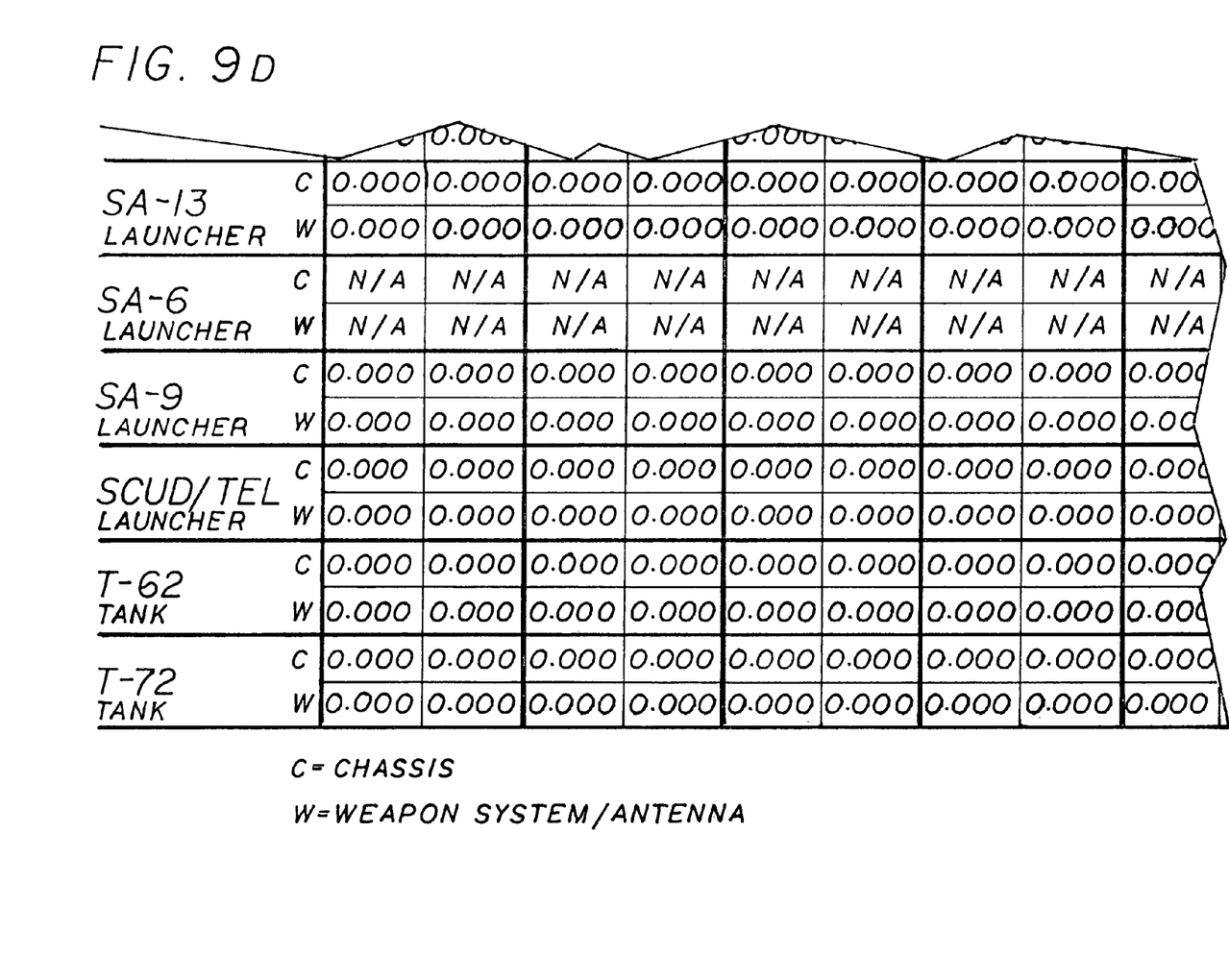
Figure 9E:
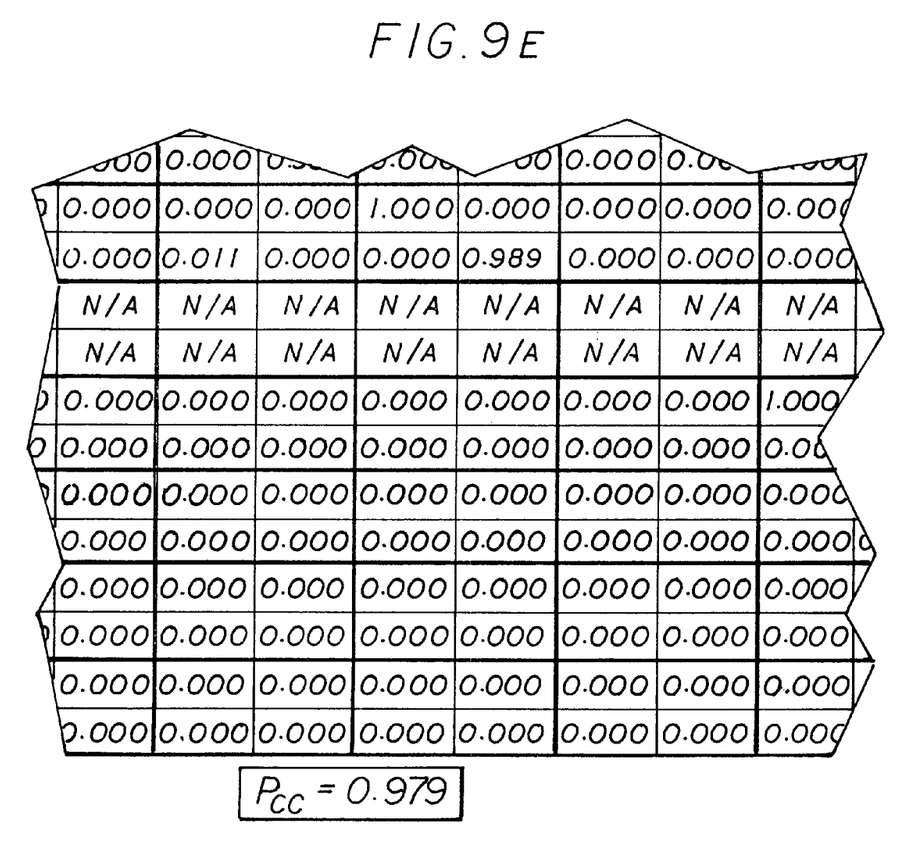
Figure 9F:
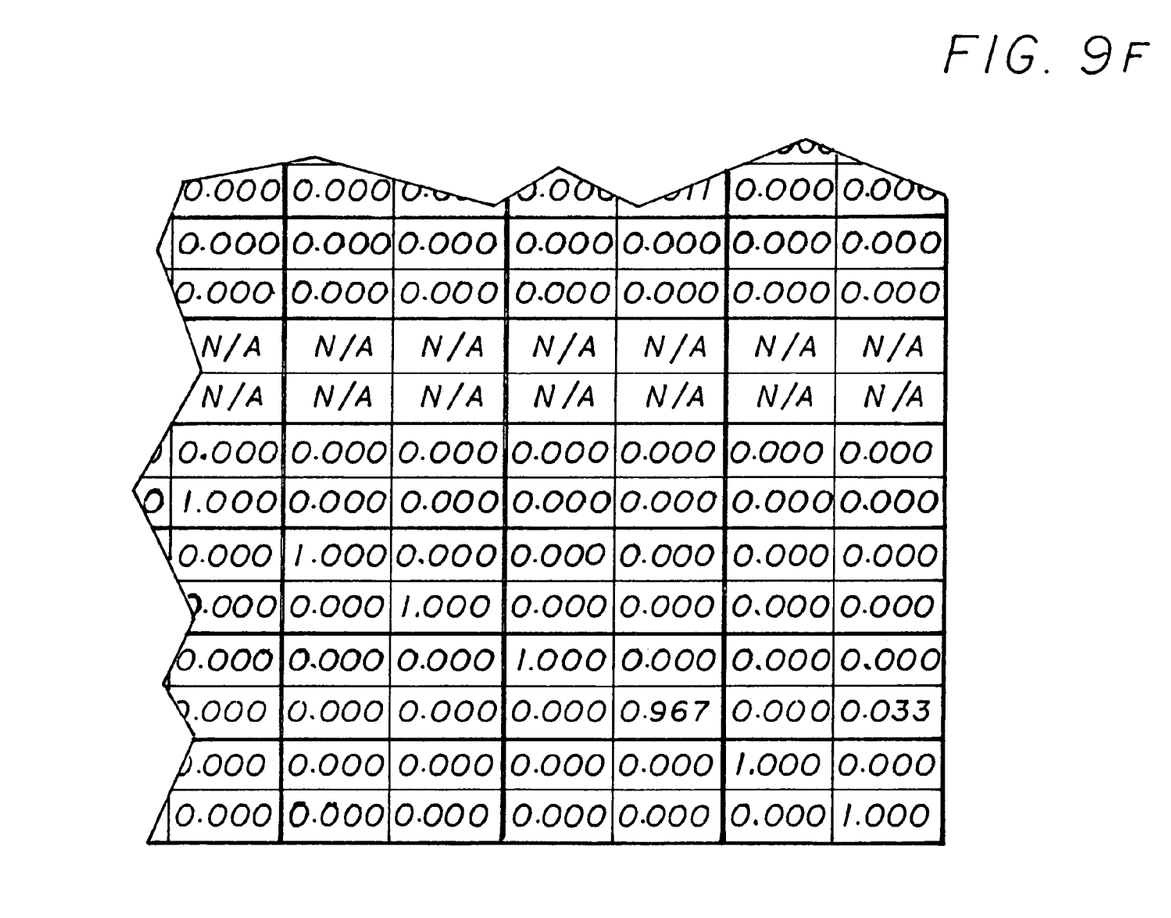

Thus it can be seen that the process can be used to identify object of interest, such as vehicles, missile launchers. Tests results provided in FIGS. 9A. 9B, 9C, and 9D, have confirmed that the process can identify a great many objects, with great accuracy. Note that certain results that have been encircled, and identified by numerals 82A, 82B, 82C and 82D indicate very low probabilities of error, in the 10 percent range.

While the invention has been described with reference to a particular embodiment, it should be understood that the embodiment is merely illustrative as there are numerous variations and modifications, which may be made by those skilled in the art. Thus, the invention is to be construed as being limited only by the spirit and scope of the appended claims.

INDUSTRIAL APPLICABILITY

The invention has applicability to the surveillance systems industry.

The invention claimed is:

1. A process for identifying an unknown object, the process comprising the steps:
    compiling data on selected features of a plurality of articulated segments of a plurality of known objects by making piecewise pixel-pair invariant measurements of each of the plurality of segments of the known objects;
    illuminating the unknown object by means of a laser radar system;
    dividing the unknown object into a plurality articulated segments corresponding to each of the segments of the known objects;
    sequentially measuring selected features of each of the plurality of segments of the unknown object by making piecewise pixel-pair invariant measurements of each of the plurality of segments of the unknown objects; and
    comparing the piecewise pixel-pair invariant measurements of each of the plurality of segments of the unknown object until a match is found
    wherein the pixel-pair invariant measurements include the distance between first and second pixels of the pixel-pairs, the angle between the normals, $N_p$ and $N_Q$, to the surface area about the first and second pixels, the normalized distance between the first and second pairs along $N_p+N_Q$, and the normalized distance between the first and second pairs along $N_p*N_Q$ and
    comparing the sequentially measuring selected features of each of the plurality of segments of the unknown object to the selected features on the plurality of segments of the plurality of known objects to identify the unknown object.

2. The process as set forth in claim 1 wherein in the step of compiling data on selected features on a plurality of segments of a plurality of known objects the plurality of segments of the plurality of known objects are bottom and top segments.

3. The process as set forth in claim 1 wherein in the step of compiling data on selected features on a plurality of segments of a plurality of known objects the plurality of segments of the plurality of known objects are bottom, middle and top segments.

4. The process as set forth in claim 3 wherein the pixel-pair invariants are selected from those having angles between normals to their respective surfaces of between 80 and 100 degrees.

5. The process as set forth in claim 4 wherein the step of dividing the unknown object into a plurality segments corresponding to each of the segments of the known objects includes the step of determining the slope of the ground the object is residing on.

6. The process as set forth in claim 5 wherein the step of making piecewise pixel-pair invariant measurements of each of the plurality of segments of the unknown object is conducted with the source of the laser radar at an angle of between 30 and 60 degrees to the slop of the unknown object.

* * * * *